Figure 1:
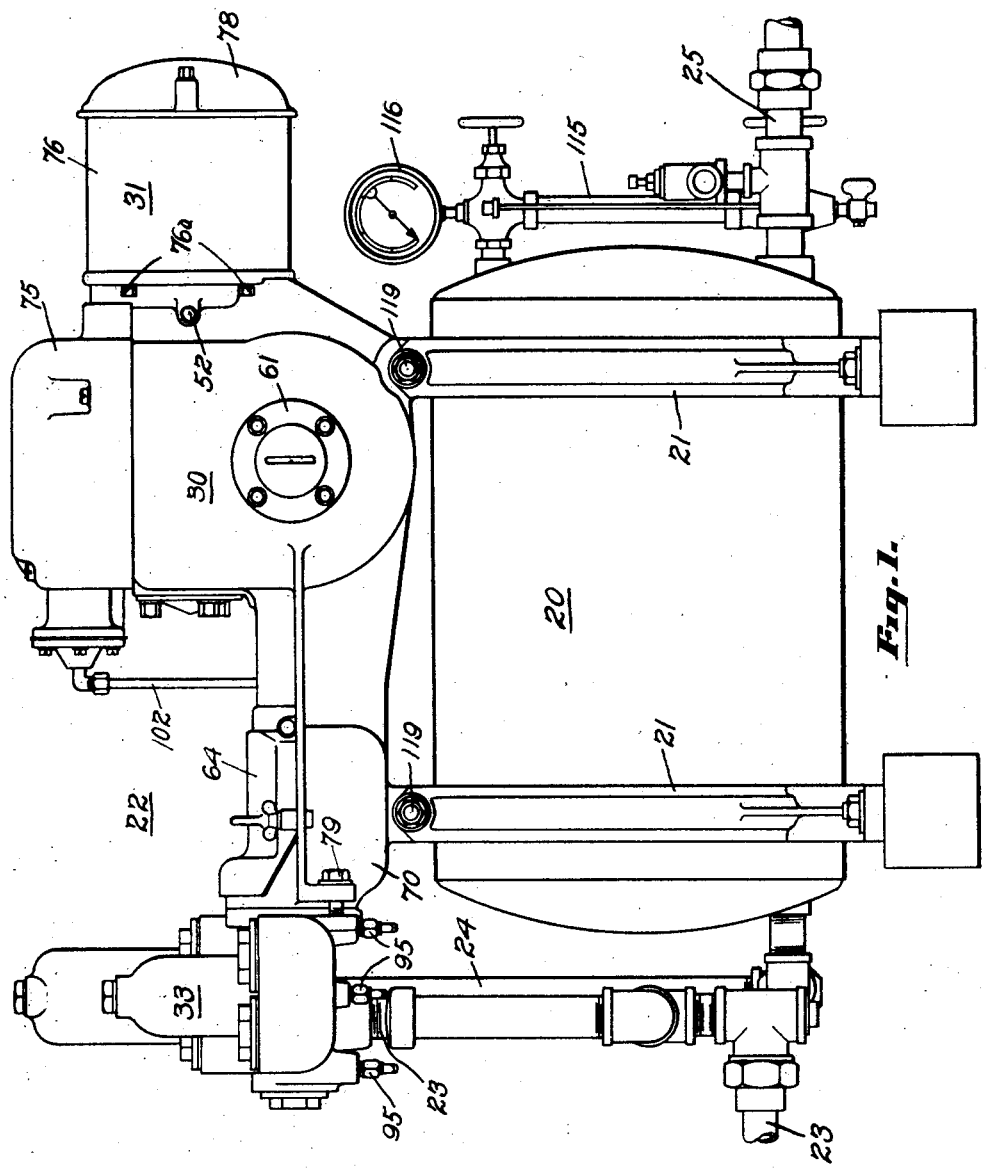

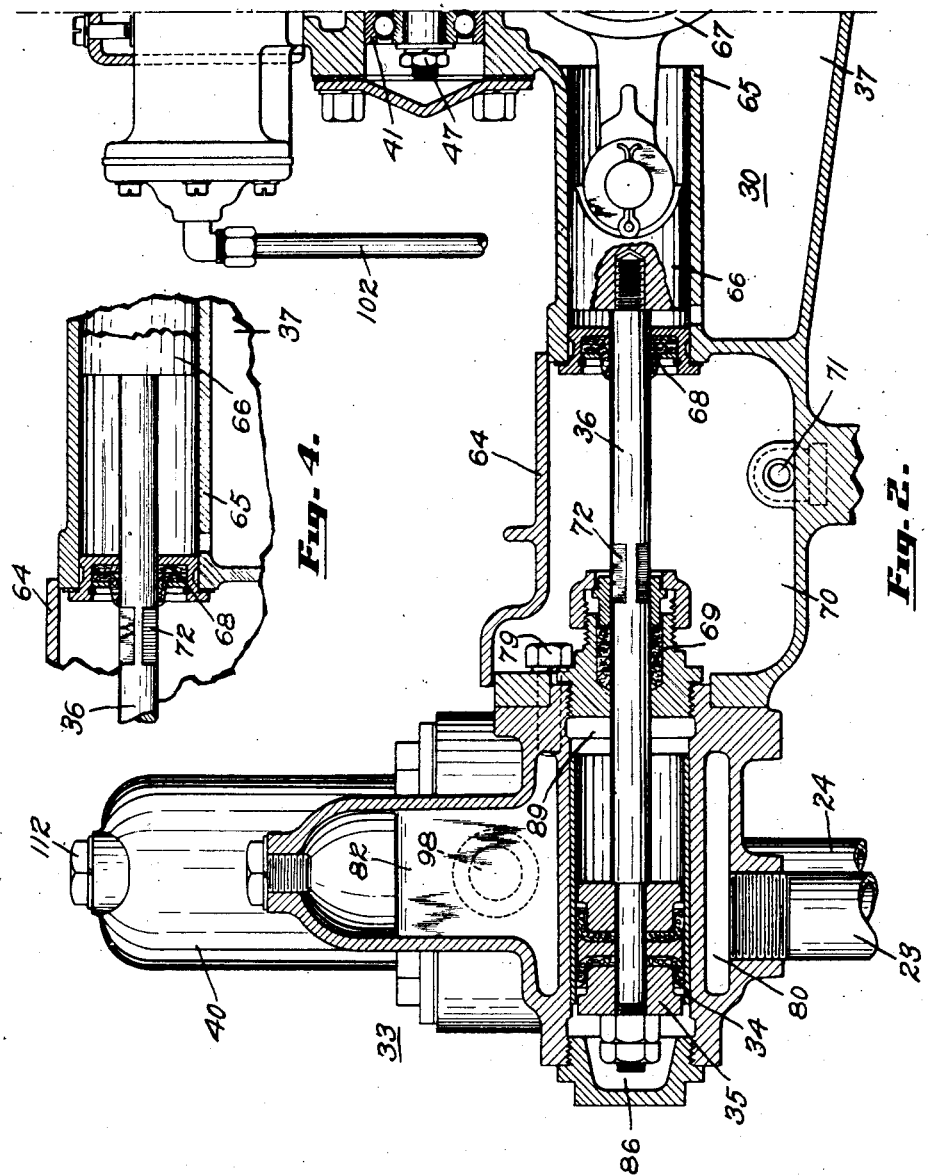

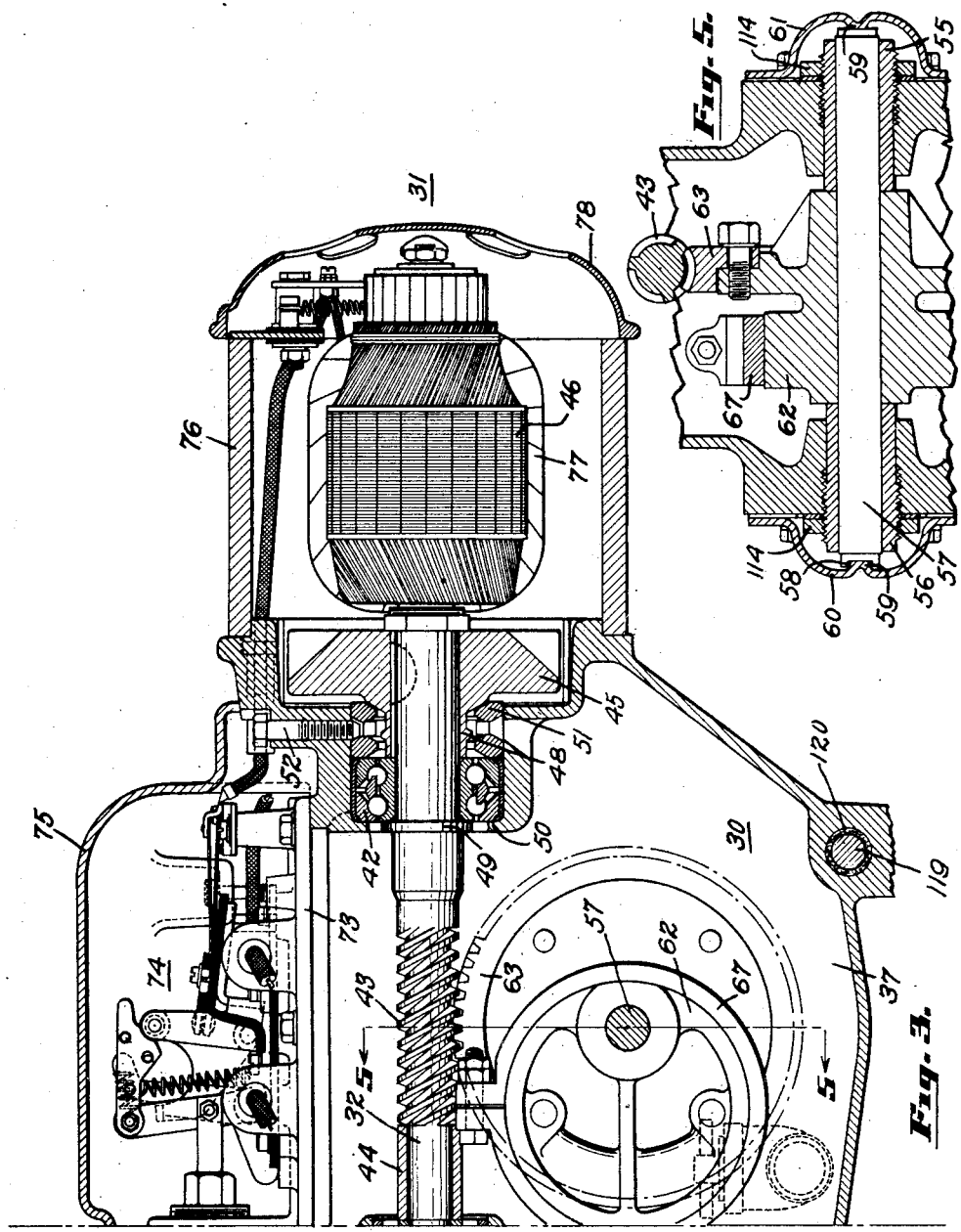

Patented July 30, 1929.

1,722,273

UNITED STATES PATENT OFFICE.

GEORGE A. BUVINGER AND CLARENCE WARNER, OF DAYTON, OHIO, ASSIGNORS TO DELCO-LIGHT COMPANY, OF DAYTON, OHIO, A CORPORATION OF DELAWARE.

POWER TRANSMISSION.

Application filed November 18, 1921, Serial No. 516,159. Renewed June 15, 1928.

The present invention relates to water systems, and particularly to that type used for domestic purposes where city water is not available, and in which a relatively small tank and a large pump are employed. The present invention is an improvement on the water system disclosed in the copending application of Charles F. Kettering and George A. Buvinger, Serial No. 299195, filed May 23, 1919.

It is an object of the present invention to provide a transmission mechanism for pump or other devices in which the working parts thereof can be readily assembled and disassembled for the inspection and repair thereof.

Other and further objects and advantages will be apparent from the following description, reference being had to the accompanying drawings, wherein a preferred form of one embodiment of the invention is clearly shown.

In the drawings:

Fig. 1 is a side elevation of the pump unit and tank to which our improved transmission mechanism has been applied.

Figs. 2 and 3 taken together form a longitudinal sectional view of the pump unit, the pump piston rod being shown in one of its extreme operating positions.

Fig. 4 is a fragmentary sectional view showing the piston rod at its other extreme position, and Fig. 5 is a fragmentary sectional view of the transmission mechanism taken on line 5—5 of Fig. 3.

Referring to the drawings, in which our invention is exemplified in connection with a pump, 20 is a tank carried by tank brackets 21. A pump unit 22 is supported by the tank brackets 21 and has an inlet pipe 23 and an outlet pipe 24. Pipe 24 carries the water from the pump unit to the tank from which it is distributed as desired through pipe 25.

The pumping unit comprises a gear casing 30 in which the driving mechanism of the pump unit is contained. Gear casing 30 also carries a motor 31. The armature shaft 32 of the motor extends into the gear casing and forms part of the driving mechanism. The pump unit comprises also a detachable pump head 33 having a cylinder 34 in which piston 35 is adapted to operate. Reciprocatory motion is imparted to the piston 35 by the driving mechanism through a piston rod 36 which is connected with the driving mechanism in the gear casing 30. A priming device 40 is detachably connected to the pump head 33 and is adapted to supply a sufficient quantity of water for priming the pump.

Referring more in detail to the construction of the pump unit as shown in Figs. 2 to 5, casing 30 comprises one main casting which encloses all of the driving mechanism and forms a lubricant reservoir 37. A bearing 41 is carried in one end of the casing 30 while bearing 42 is carried in the opposite end wall. The armature shaft 32 is journalled in the bearings 41 and 42 and is provided with a worm 43 and a sleeve 44. The armature shaft 32 also carries a flywheel 45 and an armature 46. The inner race of bearing 41 is secured to the armature shaft by clamping it between the sleeve 44 and a nut 47, while the outer race is permitted to move horizontally in the end wall of the casing 30. The inner race of bearing 42 is clamped between a projection 48 on the flywheel 45 and a collar 49 on the shaft 32, while the outer race thereof is clamped between a shoulder 50, on the end wall of the casing 30, and a bearing retainer 51. Bearing retainer 51, which is in the form of a ring, is then locked in position by locking screws 52. It will be observed from the drawings that the opening in the gear case adjacent to the shoulder 50 is larger in diameter than the outside diameter of bearing 41, for a purpose to be described hereinafter.

Screw threadedly engaged and adjustably mounted with respect to the casing 30 are two sleeves 55 and 56, which carry an axle 57 having a notch 58 which engages a boss 59 on a bearing plate 60. The notch 58 and the boss 59 cooperate to prevent the axle 57 from turning in the sleeves 55 and 56. A second bearing plate 61 on the opposite side of the casing 30 is also provided with a boss 59, against which the axle abuts and which limits the horizontal movement of the axle. Rotatively mounted on the axle 57 is an eccentric 62 carrying a worm gear 63 which cooperates with the worm 43.

The gear casing 30 also forms a sleeve 65 in which is slidably mounted a crosshead 66. Crosshead 66 is connected to and driven by the eccentric 62, through an eccentric strap 67 which herein functions as a connecting rod, and crosshead 66 is also connected with piston 35 by means of the pump piston rod 36. Gear casing 30 is provided at the top with a cover plate 73 upon which the control mechanism 74 for the pump is mounted. The control mechanism is enclosed by means of a cover 75.

A motor field frame 76 having field windings 77 and a cover 78 is removably secured to the gear casing 30 by bolts 76ª.

Gear casing 30 also forms a drip box 70 provided with a cover 64. The pump head 33 is detachably mounted upon the drip box 70 by means of bolts 79. The pump piston rod 36 extends from the lubricant reservoir 37 through the drip box 70 into the pump head. A packing box 68 is provided between the drip box and the lubricant reservoir 37, and a packing box 69 is provided between the drip box 70 and the pump head. These packing boxes surround the piston rod 36 and normally prevent lubricant and water from escaping from the gear casing and pump head, respectively. Should any liquid escape, it will collect in the drip box and may be drained off through a drain 71.

By referring to Figs. 2 and 4 it can be seen that the drip box is of such a length that the packing boxes can be placed at a distance far enough apart with respect to the length of the reciprocating stroke of the piston rod 36, that the portion of the piston rod which enters one of the packings will not enter the other. In this manner that portion of the piston rod which comes in contact with the oil packing 68 does not come in contact with the water packing 69, and therefore no oil will be carried to the water packing and thence into the cylinder. Likewise, that portion of the piston rod entering the water packing 69 will not carry water into the oil packing 68 and thence into the lubricant reservoir 37. There is thus a portion of the piston rod between the packings 68 and 69 which does not enter either of the packings. This portion is squared as at 72 to form a tool hold for a wrench. This tool hold 72 is always readily visible when the cover 64 has been removed, and when it is necessary to disconnect the piston rod 36 from the crosshead 66, the attendant will use a wrench at the tool hold. If the attendant should use a wrench which would mutilate the tool hold 72, no damage would be done to the packings because the tool hold does not enter either of the packings. If no tool hold was provided it would be necessary to use a Stillson wrench or the like. This type of wrench is very apt to mutilate the piston rod and also, without the tool hold, no special place would be indicated at which the wrench should be applied; and it would often happen that the rod would be mutilated at a place which entered the packing, causing the packing to be torn.

The operation of the device is as follows: When current is supplied to the motor the armature shaft 32 is rotated, causing reciprocatory motion to be imparted to the piston by means of the worm gear 63, eccentric 62, eccentric strap 67 and piston rod 36.

It will be apparent from the foregoing description that the present invention has many advantages over the usual form of pump, some of which will be hereinafter pointed out.

As may be seen from the drawings, the armature shaft with its armature, bearings, bearing restrainer, and flywheel, constitutes a unit which may be easily inserted into the gear casing or removed therefrom in a manner to be presently described. The gear casing and its associated motor and driving mechanism are assembled by inserting the eccentric 62, eccentric strap 67, crosshead 66, and gear 63 as an assembly, into the gear casing through the opening in the top thereof. The piston and piston rod 36 may then be connected to the crosshead. The armature shaft with its armature, bearings, bearing retainer and flywheel, are then placed in position by inserting the bearing 41 and armature shaft through the opening formed in one end wall of the gear casing adjacent to the shoulder 50, and then locating the bearing 41 in the opposite end wall. It will be noted that the opening formed adjacent the shoulder 50 is of such a diameter to permit the bearing 41 to pass through and not large enough to permit bearing 42 to pass. The armature shaft is then pushed inwardly until the bearing 42 abuts the shoulder 50. The bearing retainer 51 is then in position to be locked by the locking screw 52. The gear 63 is then brought into mesh with worm 43 by inserting the axle 57 from the outside of the gear casing through the adjusting sleeves 55 and 56, and eccentric 62. The alignment of the gears being controlled by the sleeves 55 and 56 which when turned causes the eccentric carrying the gear 63 to move horizontally. After the gear has been aligned with respect to worm 43, the sleeves are locked in position by locking nuts 114. Then the bearing plates 60 and 61 are placed in position to prevent the axle 57 from rotating and moving horizontally. The cover 73 for the top of the gear casing and the motor field frame 76 which surrounds the armature, can then be placed in their respective positions. Access to the armature is readily attained by merely loosening the bolts 76ª which permits the removing of the field frame 76 from the gear casing which causes the armature to be laid bare without disturbing the armature. Should it be desired to remove any of the driving mechanism it is only necessary to remove either bearing plate 60 or 61 to withdraw the axle 57 out of the gear casing, permitting the eccentric and gear 63 to be lowered out of mesh with worm 43. Then after locking screws 52 are loosened, permitting the horizontal movement of the bearing 42, the armature shaft with its armature, bearings, bearing retainer and flywheel, can be removed endwise as a unit. When the axle 57 or eccentric and gear 63 are withdrawn from the gear casing it is not necessary to disturb the adjustment of the sleeve 55 and 56 so that when the parts are again put in place, the same horizontal adjustment is had. Due to end thrust one side of the eccentric is subject to wear, causing the gear 63 to be thrown out of alignment with worm 43 and also causing noises when the eccentric strikes the sleeve. The gearing can be re-aligned and the noises eliminated by again adjusting the sleeves.

By constructing a driving mechanism in which the armature shaft, armature, flywheel, bearing and bearing retainer means are endwise removable, a unit is provided which facilitates the manufacturing of the entire device and which is readily accessible for the repair of any of said parts.

In the particular embodiment of the invention shown and described, the field frame or stationary part of the electric machine carries the field winding and the armature or movable part carries the armature winding, but this arrangement is merely illustrative and is not intended as importing any limitations on the meaning of the terms "field frame" and "armature" as employed in the specifications and claims, it being understood by those skilled in the art that the terms "field frame" and "armature" as herein employed are synonymous with the terms "stator" and "rotor," respectively, which are in general use in the art and which it is understood may carry other forms of windings than those herein disclosed, without in any way departing from the spirit and scope of the invention.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What we claim is as follows:

1. A driving mechanism comprising in combination, an electric motor; a casing carrying said motor; transmission mechanism within the casing and connecting the motor with apparatus to be driven, said transmission mechanism including a unitary assembly removably carried by the casing, said unitary assembly including a shaft journaled in the casing and carrying a flywheel and the armature of the motor, said transmission mechanism also including a rotatable power transmitting device; an axle supporting said device and adapted to hold it in operative connection with the said shaft, said axle being removable for disengaging the device from the shaft whereby the unitary assembly may be removed.

2. A driving mechanism comprising in combination, an electric motor; a casing carrying said motor and having bearing means; transmission mechanism within the casing and connecting the motor and apparatus to be driven, said transmission mechanism including a unitary assembly removably carried by the casing, said unitary assembly including a bearing retainer, a shaft journaled in the bearing means and carrying the armature of the motor, said transmission mechanism also including a rotatable power transmitting device; an axle supporting said device and adapted to hold it in operative connection with the said shaft, said axle being removable for disengaging the device from the shaft whereby the unitary assembly may be removed.

3. A driving mechanism comprising in combination, an electric motor; a casing carrying said motor; transmission mechanism within the casing and connecting the motor with apparatus to be driven, said transmission mechanism including a unitary assembly removably carried by the casing, said unitary assembly including a shaft carrying the armature of the motor, bearing means for the shaft, said transmission mechanism also including a rotatable power transmitting device; an axle supporting said device and adapted to hold it in operative connection with the said shaft, said axle being removable for disengaging the device form the shaft whereby the unitary assembly may be removed.

4. A driving mechanism comprising in combination, an electric motor; a casing carrying said motor; transmission mechanism within the casing and connecting the motor with apparatus to be driven, said transmission mechanism including a unitary assembly removably carried by the casing, said unitary assembly including bearing means in opposite walls of the casing, a driving member between said walls and journaled in the bearing means, said transmission mechanism also including a rotatable power transmitting device; an axle supporting said device and adapted to hold it in operative connection with the said shaft, said axle being removable for disengaging the device from the driving member whereby the unitary assembly may be removed.

5. A driving mechanism comprising in combination, an electric motor; a casing carrying the field of said motor; a transmission mechanism within the casing and connecting the motor with apparatus to be driven, said transmission mechanism including a unitary assembly removably carried by the casing, said unitary assembly including a shaft journaled in the casing and having a projecting end carrying the armature of the motor, said transmission mechanism also including a rotatable power transmitting device; an axle supporting said device and adapted to hold it in operative connection with the said shaft, said axle being removable for disengaging the device from the shaft whereby the unitary assembly may be removed.

6. A driving mechanism comprising in combination, an electric motor; a casing carrying said motor; transmission mechanism within the casing and connecting the motor with apparatus to be driven, said transmission mechanism including a removable driving member, an axle, a rotatable power transmitting device mounted on the axle which is adapted to hold it in operative connection with the driving member, a support for the axle including means adjustable longitudinally of the axle for locating the position of the power transmitting device with respect to the driving member, said means having an opening therethrough, through which the axle may be endwise removed for disengaging the device from the member.

7. A driving mechanism comprising in combination, an electric motor; a casing carrying said motor; transmission mechanism within the casing and connecting the motor with the apparatus to be driven, said transmission mechanism including a removable driving member, an axle, a rotatable power transmitting device mounted on the axle so as to be held in operative connection with the driving member, a sleeve supported by said casing and carrying said axle, said sleeve being adjustable longitudinally of the axle for locating the position of the power transmitting device with respect to the driving member, said sleeve having an opening therethrough, through which the axle may be endwise removed for disengaging the device from the member.

8. A driving mechanism comprising in combination, an electric motor; a casing carrying said motor; transmission mechanism within the casing and connecting the motor with apparatus to be driven, said transmission mechanism including a removable driving member, an axle, a rotatable power transmitting device mounted on the axle so as to be held in operative connection with the driving member, said device being freely movable longitudinally on the axle, means for adjusting the device longitudinally of the axle for locating the position of the device with respect to the driving member, said means having an opening therethrough, through which the axle may be endwise removed for disengaging the device from the member, and means normally holding the axle against endwise removal.

9. A driving mechanism comprising in combination, an electric motor; a casing carrying said motor; transmission mechanism within the casing and connecting the motor with apparatus to be driven, said transmission mechanism including a removable driving member, an axle, a rotatable power transmitting device mounted on the axle so as to be held in positive, operative connection with the driving member, a support for the axle including means adjustable longitudinally of the axle for locating the position of the power transmitting device with respect to the driving member, said means being constructed and arranged to permit the endwise removal of the axle without disturbing the adjustment thereof.

10. A driving mechanism comprising in combination, a transmission casing; transmission mechanism within the casing, said mechanism including a plurality of rotating devices, an axle carryng one of the devices in operative relation with the other device, and a support for the axle including means adjustable longitudinally of the axle for locating the position of the rotating device carried thereby with respect to the other rotating device, said means having an opening therethrough, through which the axle may be removed sidewise for disengaging the devices.

11. A driving mechanism comprising in combination, a transmission casing; transmission mechanism within the casing, said mechanism including a plurality of rotating devices, an axle carrying one of the devices in operative relation with the other device, and a sleeve supported by the casing and carrying said axle, said sleeve being adjustable longitudinally of the axle for locating the position of the rotating device carried thereby with respect to the other rotating device, said sleeve having an opening therethrough, through which the axle may be removed endwise for disengaging the devices.

12. A driving mechanism comprising in combination, a transmission casing; transmission mechanism within the casing, said mechanism including a plurality of rotating devices, an axle, one of said rotating devices being mounted on the axle so as to be held in operative relation with the other of said rotating devices and being freely movable longitudinally on the axle, means for adjusting the device carried by the axle longitudinally of the axle for locating the position thereof with respect to said other rotating device, said means having an opening therethrough, through which the axle may be removed endwise for disengaging the device, and means normally holding the axle against endwise removal.

13. A driving mechanism comprising in combination, a transmission casing; transmission mechanism within the casing, said transmisson mechanism including a plurality of rotating devices, an axle carrying one of the devices in operative relation with the other device, a support for the axle including means adjustable longitudinally of the axle for locating the position of the rotating device carried thereby with respect to the other rotating device, said means being constructed and arranged to permit the endwise removal of the axle without disturbing the adjustment thereof.

14. A driving mechanism comprising in combination, an axle, a rotating device carried by the axle, a support for the axle including means adjustable longitudinally of the axle for moving the rotating device longitudinally of the axle, said means being constructed and arranged to permit the endwise removal of the axle without disturbing the adjustment thereof.

In testimony whereof we hereto affix our signatures.

GEORGE A. BUVINGER.
CLARENCE WARNER.